US010357916B2

(12) United States Patent
Haboury (10) Patent No.: US 10,357,916 B2
(45) Date of Patent: Jul. 23, 2019

(54) METHOD FOR CONTROLLING A MOLDING UNIT

(71) Applicant: SIDEL PARTICIPATIONS S.A.S., Octeville-sur-Mer (FR)

(72) Inventor: Pascal Haboury, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 123 days.

(21) Appl. No.: 15/358,651

(22) Filed: Nov. 22, 2016

(65) Prior Publication Data

US 2017/0144357 A1   May 25, 2017

(30) Foreign Application Priority Data

Nov. 25, 2015   (FR) ...................................... 15 61326

(51) Int. Cl.
   *B29C 49/54*   (2006.01)
   *B29C 49/48*   (2006.01)
   (Continued)

(52) U.S. Cl.
   CPC .............. *B29C 49/78* (2013.01); *B29C 49/48* (2013.01); *B29C 49/56* (2013.01); *B29C 49/70* (2013.01); *B29C 49/06* (2013.01); *B29C 49/12* (2013.01); *B29C 49/36* (2013.01); *B29C 2049/4841* (2013.01); *B29C 2049/4856* (2013.01); *B29C 2049/4858* (2013.01);
   (Continued)

(58) Field of Classification Search
   CPC .......... B29C 49/541; B29C 2049/4807; B29C 2049/4892; B29C 49/70
   See application file for complete search history.

(56) References Cited

U.S. PATENT DOCUMENTS

| 4,465,199 A | 8/1984 | Aoki |
| 2006/0093699 A1 | 5/2006 | Arkelyan |

(Continued)

FOREIGN PATENT DOCUMENTS

| EP | 2626190 A1 * | 8/2013 | ......... B29C 49/4236 |
| FR | 2 508 004 A1 | 12/1982 | |

(Continued)

OTHER PUBLICATIONS

French Search Report, dated Jul. 12, 2016, from corresponding French Application.

*Primary Examiner* — Robert B Davis
(74) *Attorney, Agent, or Firm* — Young & Thompson (57) ABSTRACT

A method for controlling a molding unit (10) for the forming of a container made of thermoplastic material by blow molding of a preform, with the unit (10) including:
 a carriage (24) that carries, in a stationary manner, a mold bottom (16);
 at least one stationary cylinder (32) housing a piston (98) that slides between a lower rest position and an upper boxing position in which it pushes the carriage (24) from an intermediate position to an upper molding position;
 actuating elements for moving the carriage (24) from its upper molding position to a lower extraction position;
with the method including an extraction step (E4) wherein the movement of the carriage (24) toward its lower extraction position is initiated while the piston (98) has not yet returned into its lower rest position.

9 Claims, 8 Drawing Sheets

(51) Int. Cl.
*B29C 49/70* (2006.01)
*B29C 49/78* (2006.01)
*B29C 49/56* (2006.01)
B29L 31/00 (2006.01)
B29K 67/00 (2006.01)
B29C 49/06 (2006.01)
B29C 49/12 (2006.01)
B29C 49/36 (2006.01)

(52) U.S. Cl.
CPC ................. *B29C 2049/4892* (2013.01); *B29K 2067/003* (2013.01); *B29L 2031/7158* (2013.01)

(56) References Cited

U.S. PATENT DOCUMENTS

2012/0052148 A1 3/2012 Langlois
2017/0036389 A1* 2/2017 Cirette .................... B29C 49/12

FOREIGN PATENT DOCUMENTS

| FR | 2 945 469 A1 | 11/2010 |
| WO | 2015/158559 A1 | 10/2015 |

* cited by examiner

METHOD FOR CONTROLLING A MOLDING UNIT

TECHNICAL FIELD OF THE INVENTION

The invention relates to a method for controlling a molding unit for forming a container made of thermoplastic material by blow molding.

TECHNICAL BACKGROUND OF THE INVENTION

The invention relates more particularly to a method for controlling a molding unit for the forming of a container made of thermoplastic material by blow molding, in particular by stretch blow molding, of a preform, with the molding unit comprising:

- A carriage that carries, in a stationary manner, a mold bottom and that is mounted to move in a stationary support between a lower position for extraction of the finished container and an upper position for molding a base of the container;
- First actuating means for moving the carriage in relation to its stationary support between the lower extraction position and an initial intermediate boxing position in which the bottom can be enclosed between two half-molds in the attached position;
- Second actuating means for moving the carriage in relation to its stationary support from the initial intermediate boxing position to the upper molding position, with the second actuating means comprising at least one stationary cylinder in relation to the support housing a piston that divides the cylinder into a lower working chamber and an upper chamber, with the piston being able to slide between a lower rest position and an upper boxing position in which it pushes the carriage to its upper molding position by pressurizing a working fluid in the lower working chamber relative to the pressure prevailing in the upper chamber;
- Third actuating means for moving the carriage from its upper molding position to its lower extraction position;

With the method comprising a step for extraction of a finished container taking place after the carriage has been pushed to its upper molding position by the piston, during which the carriage is moved from its upper molding position to its lower extraction position by the third actuating means.

Such molding units comprising a device for carrying out a so-called "boxing" operation of the base of a container, such as, in particular, a bottle made of thermoplastic material, are known in the state of the art.

Such a boxing operation is described in, for example, the document FR-2,508,004, to which reference will be made, in a non-limiting manner, for more ample details on this forming technique.

The boxing operation corresponds to a forming technique used during the manufacturing of containers for which particular characteristics are desired, in particular made of material with structural rigidity of their bases, for example for certain plastic bottles manufactured from PET (polyethylene terephthalate).

This forming technique is in particular, but not exclusively, used for the purposes of manufacturing containers such as those bottles that are designed to be filled "hot," i.e., filled by a liquid to be packaged whose temperature is, for example, between 60° C. and 95° C. It makes it possible to obtain a flexible base forming a membrane that becomes deformed under the action of negative pressure created by the cooling of the hot liquid contained in the closed container.

This technique is also able to be used for reducing the quantity of material present in the base of the container whose weight is desired to be lightened so as to reduce its cost and/or also for aesthetic reasons.

The boxing technique consists in moving, during the forming, the part of the mold that is intended for the molding of the base of the container, called "mold bottom" in the description below, or else "mold of the bottom" in the document referenced above. This movement is carried out while the constituent material of the preform or the container (formed or in formation) also has a suitable deformation temperature. This movement makes it possible for the mold bottom to stretch the material constituting the base of the container. The mold bottom thus emerges like a first for "boxing" the base of the container during forming, hence the name of the boxing operation.

In the known molding installations that do not implement a boxing operation, it is already known to move the mold bottom between its lower position for extraction of the container and its molding position by means of a cam actuating device. Such a device makes it possible in particular to obtain fast and precise control of the movements of the mold bottom. Such a rapidity of actuation is not possible with a pneumatic jack. Nevertheless, the cam actuating devices do not make it possible to obtain a sufficient force to carry out a boxing operation.

To solve this problem, it has been proposed to control the movements of the mold bottom by means of a first cam actuating device making possible fast and precise positioning of the mold bottom, and by means of a second pneumatic actuating device that makes it possible to move the mold bottom on its boxing path with a sufficient force to carry out the boxing operation.

FIGS. 5 to 8 of the document FR-2,508,004 show the primary steps of this technique and illustrate an example of a boxing operation implemented during the forming of a bottle made of thermoplastic material.

By comparison with a conventional mold comprising two half-molds and a separate mold bottom, the mold bottom is not axially immobilized by the attached half-molds but it can be moved axially by actuating means between an initial intermediate boxing position (bottom position) and a final upper molding position (top position).

In FIG. 5 illustrating a first step, the mold bottom is moved toward the half-molds for occupying the initial position in which it is positioned axially set back in such a way that the axial dimension (height) of the molding cavity is larger than that of the body of the final container.

A preform, introduced into the mold, extends axially through an opening emptying into a molding cavity that delimits the two half-molds associated with the mold bottom, said half-molds mounted to move between a separated position and an attached position (shown in FIG. 5).

In FIG. 6 illustrating a second step, the preform is stretched axially by a stretching rod until reaching approximately the top part of the mold bottom.

The mold bottom then again occupies its initial intermediate boxing position; the axial stretching of the preform is done according to a maximum stretching path that is higher than the height of the container (bottle) or with a path that corresponds to the difference between the initial intermediate boxing position and the final molding position of the mold bottom. In this final molding position, the axial dimension of the molding cavity corresponds to that of the final container.

Such a stretching operation is carried out in combination with a blow-molding operation, preferably respectively preceded by a pre-blow molding, in such a way as to obtain a bi-axial stretching, i.e., a biaxial molecular orientation of the material thanks to which the structural rigidity of the base of the container in particular is improved.

At the end of this second step, the base of the container is not yet formed here, and the material still has a deformation temperature. The mold bottom is then moved axially upward by associated actuating means, from the initial position to the final molding position illustrated in FIG. 8.

The mold bottom passes through an axial boxing path during which said mold bottom will stretch the material by axially pushing back the base in the direction of the inside of the container.

However, according to the application, the techniques vary and the boxing operation can be performed during or after the formation of the container that is ultimately shaped by a blow-molding operation at a blow-molding pressure.

The final blow-molding pressure can reach values on the order of 20 to 40 bars according to the applications, or consequently values that are commonly considered to be high pressures.

With the exception of the boxing operation, the forming of the container is consequently carried out in a conventional manner by the stretch blow molding of a preform made of thermoplastic material and thermally packaged in advance for this purpose, with one or more blow-molding steps consisting in injecting a pressurized fluid, in general air, inside the preform.

Of course, the description that was just given is in no way limiting, and various variants or enhancements can be provided thereto to carry out the boxing operation.

To carry out such a boxing operation of the base of the container during its forming, a device of the type described above equips each container molding unit of the machine.

Such a molding unit comprises actuating means that are designed to move the mold bottom selectively between said initial intermediate boxing position and final molding position.

The document FR-2,945,469 describes an example of actuating means of such a molding unit that can carry out a boxing operation.

According to this document, the actuating means of the mold bottom consist of a simple jack operating by means of a pressurized fluid formed by compressed air. The pneumatic jack is carried by a carriage that makes it possible to move the mold bottom from a lower extraction position to its initial intermediate boxing position. The jack is then actuated to move the mold bottom on its boxing path.

The device for carrying out the boxing according to this document and in particular the actuating means formed by such a jack are not, however, fully satisfactory.

Actually, such a device is particularly heavy, and it does not make it possible to manufacture the containers in series at a pace that is as fast as for containers manufactured without a boxing operation. This reduction in pace is due in particular to the heavy weight of the carriage thus produced.

To solve the above-cited drawbacks, a molding unit equipped with a carriage that carries the bottom in a stationary manner has been proposed. The carriage is mounted to move in a stationary support between a lower position for extraction of a finished container and an upper molding position. The carriage can be moved by three actuating means that are arranged in parallel between the stationary support and the carriage.

The second actuating means are formed by a piston that makes it possible to control the sliding of the carriage from an initial intermediate boxing position to the upper molding position. The piston is accommodated in a stationary cylinder in relation to the support that divides the cylinder into an upper chamber and into a lower working chamber. The piston is thus mounted to slide in a stationary cylinder in relation to the support between a lower rest position and an upper boxing position in which it pushes the carriage into its upper molding position by pressurizing the lower working chamber.

The third actuating means are formed by a cam control device, comprising in particular a cam follower roller that is mounted to rotate on the carriage. These third actuating means make it possible to make the carriage slide from its upper molding position to its lower extraction position.

During a step for extraction of a container that takes place after the piston has pushed the carriage to its upper molding position, the carriage is called toward its lower extraction position to allow the extraction of the finished container. The actuating force required on the part of the third actuating means for bringing the carriage back to its lower extraction position should be the lowest possible.

Actually, in a known manner, the third actuating means comprises a safety device that is designed to avoid damage to the molding unit when the sliding of the carriage is blocked. For example, the rod being used as an axis of rotation of the roller is produced in such a way as to break when too large a force is imposed on the roller. Because of this safety device, the service life of the roller and its shaft are relatively short. To extend the life expectancy of the roller and thus to save on replacement material and maintenance time, an effort is made to reduce the actuating force applied by the roller on the carriage during the extraction step.

In addition, the reduction of the actuating force also makes it possible to save energy.

To minimize the actuating force required, one skilled in the art believed it obvious to bring the piston back into its lower rest position before the third actuating means calls for the sliding of the carriage toward its lower extraction position.

To do this, the pressure in the lower working chamber is lowered and/or the pressure in the upper chamber is increased. When the pressure in the lower working chamber becomes less than the pressure in the upper chamber, the piston slides to its lower rest position. During this time, the carriage continues to be held in its upper molding position by an elastic return force. Then, the roller, coming into contact with the cam, causes the carriage to slide to its lower extraction position against the elastic return force. During the sliding, the roller exerts on the carriage a determined maximum actuating force that will be termed "reference actuating force" in the description below.

This way of proceeding in carrying out the extraction step is, at first glance, considered by one skilled in the art as making it possible to achieve the lowest actuating force. Actually, the roller acts only on the carriage.

The invention proposes a method for controlling the molding unit that makes it possible to carry out the extraction step with an actuating force that is also less than the reference actuating force.

BRIEF SUMMARY OF THE INVENTION

The invention proposes a method of the type described above, characterized in that during the extraction step, the movement of the carriage by the third actuating means is initiated while the piston is not yet returned into its lower rest position, with the carriage pushing the piston toward its lower rest position at least on a final part of its path to its lower extraction position.

According to other characteristics of the invention:

During the extraction step, the movement of the carriage is initiated while the piston again occupies its upper boxing position;

The carriage pushes the piston toward its lower rest position over its entire path from its upper molding position to its lower extraction position;

During the extraction step, the movement of the carriage by the third actuating means is initiated while the working fluid pressure in the lower working chamber is greater than or equal to the pressure prevailing in the upper chamber;

During the extraction step, the movement of the carriage is initiated when the pressure is balanced between the lower working chamber and the upper chamber;

The third actuating means are formed by a cam follower that is carried by the carriage and by a cam track that works with the cam follower;

The first actuating means comprise elastic return means that exert an elastic return force of the carriage toward its upper molding position;

The first actuating means comprise an arming device that can exert an arming force on the carriage to move it from its upper position to its initial intermediate boxing position against the elastic return force on an oriented path for reverse arming in relation to the boxing path;

The piston slides freely in relation to the carriage, with the carriage being able to slide between its lower position and its upper position while the piston remains stationary.

BRIEF DESCRIPTION OF THE FIGURES

Other characteristics and advantages of the invention will emerge when reading the following detailed description for the understanding of which reference will be made to the accompanying drawings in which.

DETAILED DESCRIPTION OF THE FIGURES

In the description below, elements that have an identical structure or analogous functions will be referred to by the same reference.

In the description below, the following will be adopted in a non-limiting manner: longitudinal orientations directed from back to front, vertical orientations directed from bottom to top, and transverse orientations directed from left to right, which are indicated by the trihedron "L, V, T" of the figures. These orientations are linked to the stationary support of the molding unit, with the longitudinal direction being tangent to the path of the molding unit during the rotation of the carrousel.

Figure 1:
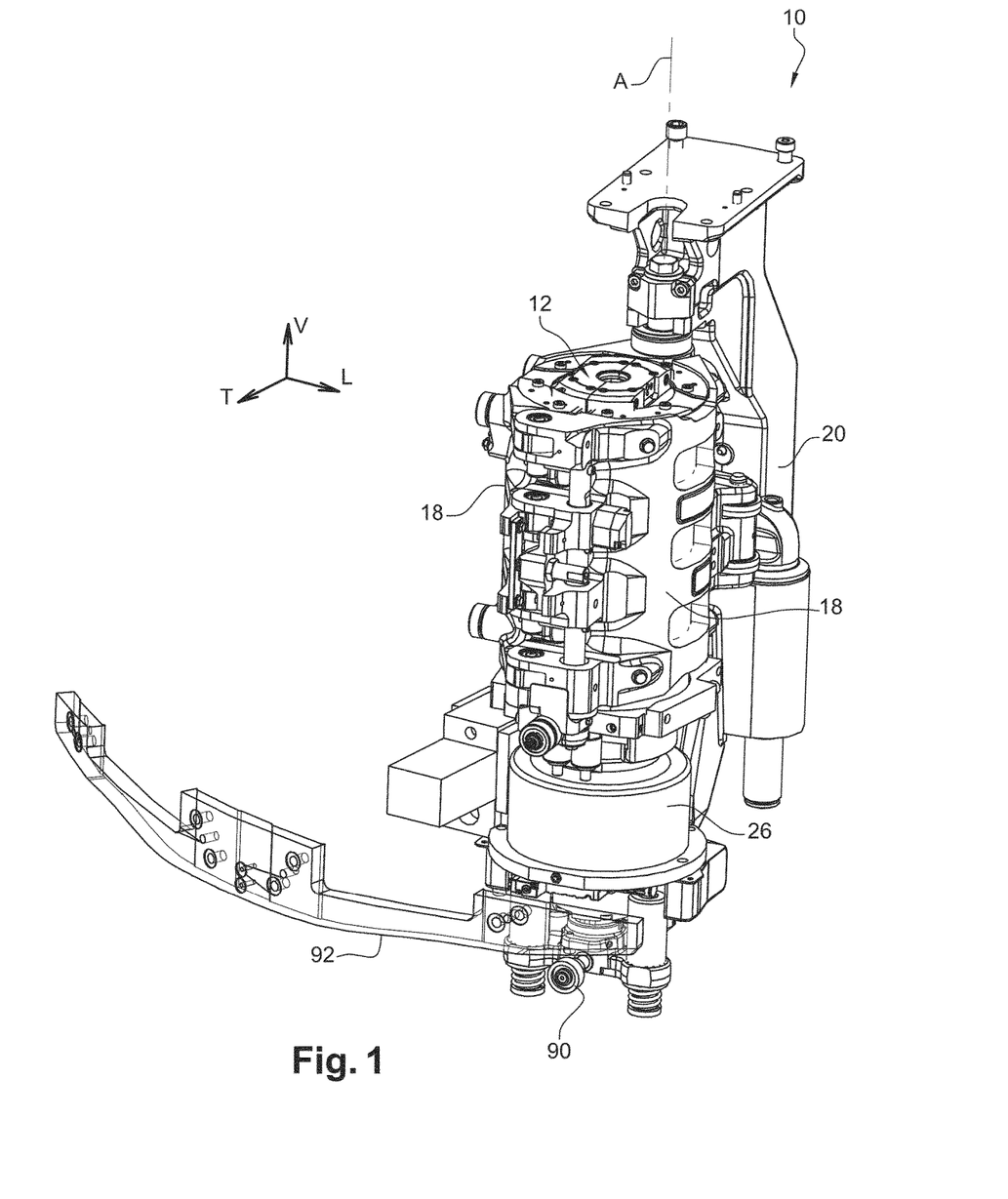
FIG. 1 is a perspective view that shows a molding unit made according to the teachings of the invention in which the half-molds occupy their attached molding position, and in which the mold bottom occupies its upper molding position.

FIG. 1 shows a molding unit 10 for the forming in series of containers made of thermoplastic material by blow molding, in particular by stretch blow molding, of a previously heated preform. The final container is, for example, a bottle.

Such a molding unit 10 is part of a blow-molding machine that generally comprises multiple identical molding units distributed on the periphery of a carrousel (not shown). The molding unit 10 is thus able to be moved along a circular path in relation to the ground on which the blow-molding machine is placed.

Figure 2:
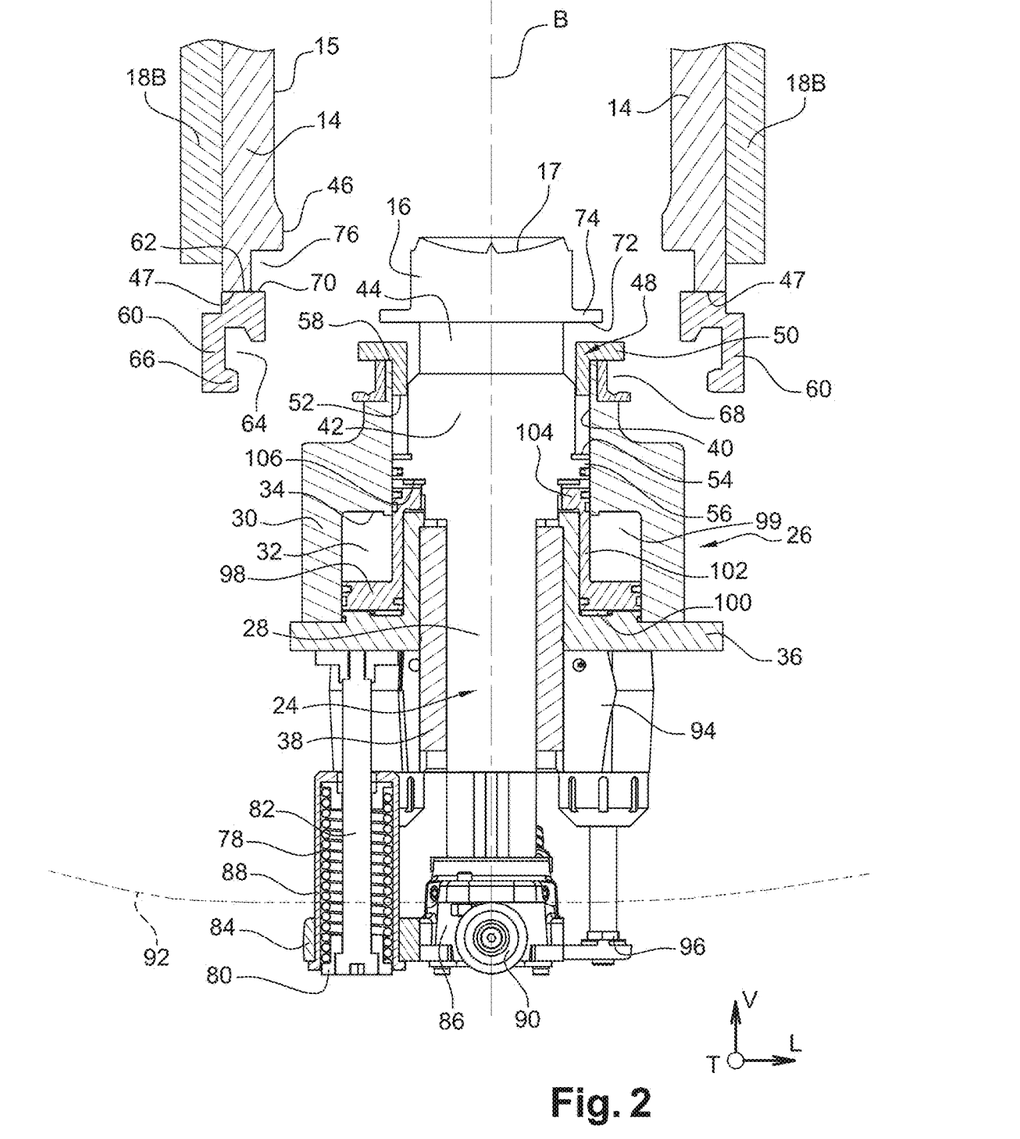
FIG. 2 is a cross-sectional view along the cutting plane 2-2 of FIG. 4 and in which the half-molds occupy their separated position while the mold bottom occupies its lower extraction position.

The molding unit 10 comprises a blow-molding mold 12. As shown in more detail in FIG. 2, the blow-molding mold 12 comprises, in a known manner:

Two half-molds 14, sometimes called "shells," which bear an impression 15 of a body of the container of vertical axis "B" that is to be obtained; and A mold bottom 16 that bears an impression 17 of the base, or bottom, of said container.

The mold bottom 16 and the half-molds 14 are able to be changed based on the shape of the final container to be obtained.

Figure 3:
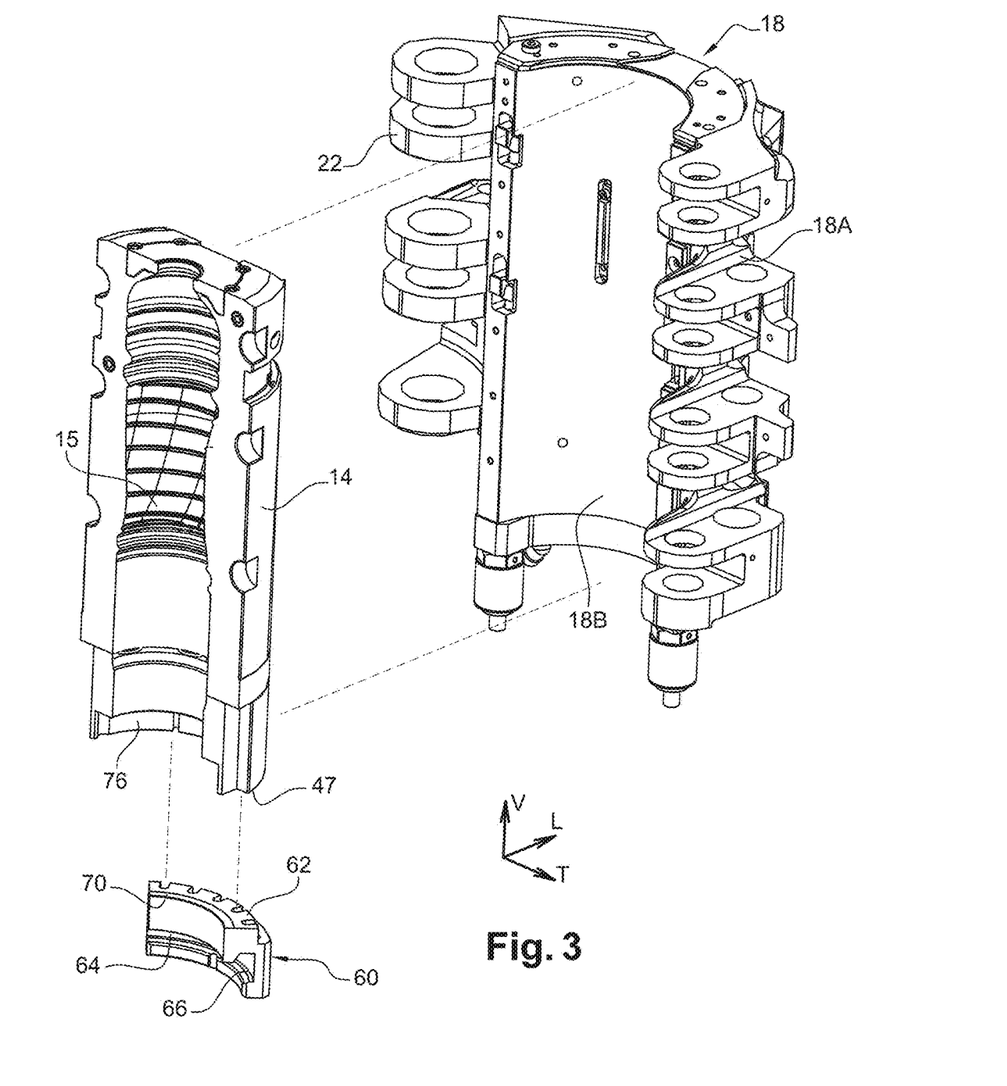
FIG. 3 is an exploded perspective view that shows a half-mold, a bit associated with the half-mold, and an associated mold support.

The half-molds 14 are generally attached in a removable manner in mold, or mold-carrier, supports 18, shown in, for example, FIG. 3. Each mold support 18 is carried by a frame 20, or bracket, shown in FIG. 1. The frame 20 is designed to be carried by the carrousel.

Figure 4:
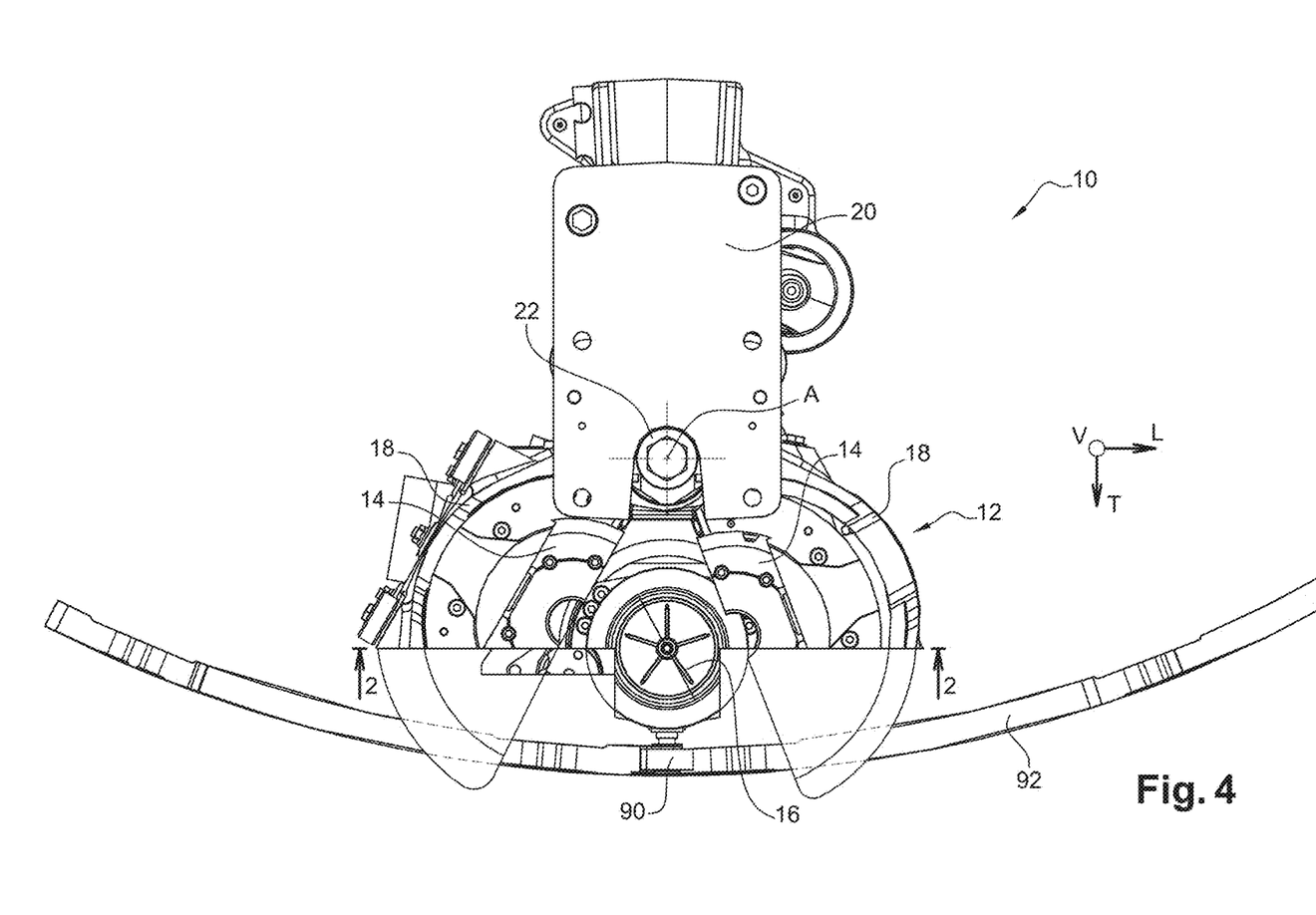
FIG. 4 is a top view of the molding unit of FIG. 1 in which the molding unit is in a state that corresponds to the state shown in FIG. 2.
Figure 5:
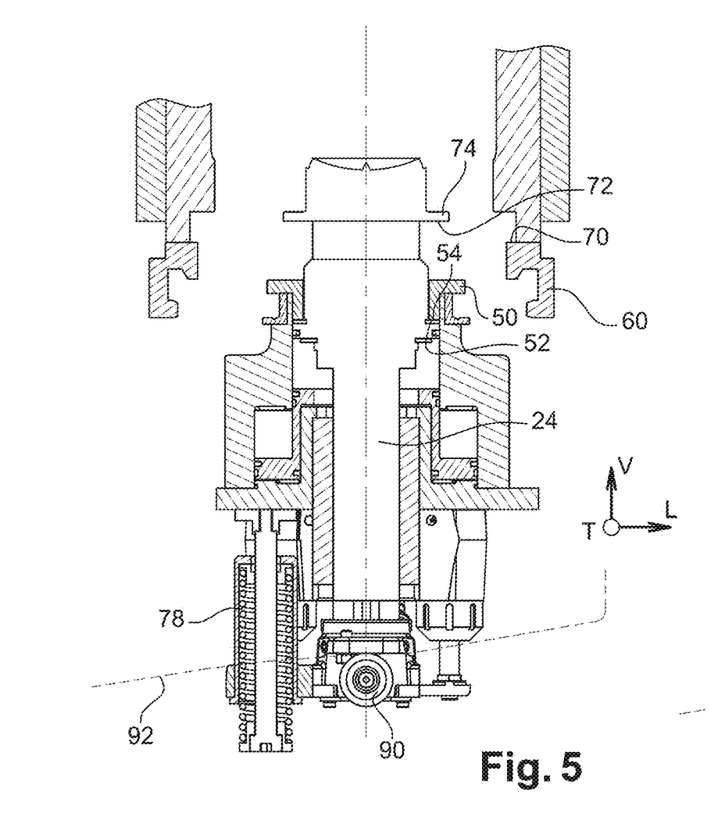
FIG. 5 is a cross-sectional view that is similar to the one of FIG. 2 that shows the half-molds in the separated position and the mold bottom in its upper molding position.

The mold supports 18 are mounted to pivot on the frame 20 by means of a common lateral hinge 22 with a vertical axis "A," as shown in FIG. 4. The two half-molds 14 can thus move longitudinally between a separated position for extraction of the finished container, as shown in FIGS. 2, 4 and 5, and an attached molding position of the container, as shown in FIGS. 6 to 10.

In a known manner, and as shown in FIG. 3, each mold support 18 is formed by a square 18A that comprises the hinge 22 and by a mold carrier 18B, also called a shell carrier, which is mounted on said square 18A. The mold carrier 18B is designed to accommodate the associated half-mold 14. The mold carrier 18B generally comprises a coolant circuit that makes it possible to regulate the temperature of the half-mold 14. In addition, the mold carrier 18B is mounted on the square 18A with a longitudinal play that makes it possible to ensure that the two half-molds 14 are effectively attached during the molding using well-known compensating means that will not be described in more detail below. The half-mold 14 is attached in a rigid, but detachable manner, in the associated mold carrier 18B.

As a variant, the half-mold 14 also comprises a fluid circuit or another heating means such as electric resistors.

In FIGS. 2 and 5 to 10, only the mold carrier 18B has been shown for the sake of clarity.

By referring to FIG. 2, the mold bottom 16 is carried in a stationary manner by a carriage 24 that is mounted to move vertically in a stationary support 26 in relation to the frame 20 of the molding unit 10. The carriage 24 and the mold bottom 16 thus form a one-piece unit. The carriage 24 has a cylindrical central portion 28 with a vertical axis that is coaxial to the axis "B" of the impression 15.

The stationary support 26 comprises an upper end bell 30 that radially delimits a cylindrical housing forming a cylinder 32 with an axis "B" that is coaxial to the impression 15. The cylinder 32 is delimited toward the top by an upper wall 34 of the bell 30, and it is closed toward the bottom by a lower horizontal cover 36.

A vertically sliding stationary guide bearing 38 that accommodates the central portion 28 of the carriage 24 passes through the cover 36 in its center. The bearing 38 thus passes through the cylinder 32. A chimney 40 for passage of the carriage 24 that axially empties under the cavity of the half-molds 14 in the closed position also passes through the bell 30 vertically in its center.

To make possible the changing of the mold bottom 16, the upper end of the carriage 24 comprises a stand 42 that is designed to make possible the fast attachment of the mold bottom 16 to the carriage 24. The stand 42 is arranged at an upper end of the central portion 28. The stand 42 is housed in the upper end chimney 40 of the bell of the stationary support 26.

As will be explained in more detail below, the carriage 24 is thus able to slide vertically between:

A lower end position for extraction of a finished container, as shown in FIG. 2, in which the mold bottom 16 is positioned below the impression 15 of the half-molds 14; and An upper end position for molding the base of the container, as shown in FIGS. 5, 7, 9 and 10, in which the mold bottom 16 is positioned between the half-molds 14 in such a way as to complete the impression 15 of the final container.

In the embodiment shown in the figures, a bracket 44 is inserted between the mold bottom 16 and the stand 42 to make it possible to vertically adjust the position of the mold bottom 16 in relation to the two half-molds 14. According to the height of the final container, it is possible to change the bracket 44, and even to eliminate the bracket 44.

In addition, the molding unit 10 can carry out a boxing operation. For this purpose, the mold bottom 16 is to be able to slide vertically between the two half-molds 14 that occupy their closed molding position. For this purpose, the half-molds 14 have, in the closed position, a vertical cylindrical opening 46 that empties toward the bottom into a lower face 47 of the half-molds 14 perpendicular to the chimney 40 of the stationary support 26 and toward the top into the cavity delimited by the impression 15 of the body of the container.

To limit the movement of the carriage 24 toward the top in its upper end position, a removable stop ring 48 is attached in a detachable manner to an upper end of the chimney 40 of the stationary support 26.

The stop ring 48 has a tubular shape. A collar 50 extends radially toward the outside from an upper end edge of the stop ring 48. The tubular portion of the stop ring 48 is accommodated in the chimney 40 in such a way as to be inserted radially between the stand 42 and the inner cylindrical face of the chimney 40. The circular edge of the lower end of the stop ring 48 forms an upper bearing face 52 that limits the movement of the carriage 24 toward the top in the upper position of the mold bottom 16.

For this purpose, the carriage comprises a first stop face 54 that is oriented vertically toward the top, opposite the bearing face 52. The first stop face 54 is carried by a first collet 56 that extends radially toward the outside from a peripheral cylindrical face of the stand 42.

The collar 50 of the stop ring 48 is placed on a horizontal upper edge 58 of the end of the chimney 40. The periphery of the collar 50 is radially flush with the periphery of the upper edge 58 of the chimney 40.

The stop ring 48 is attached to the bell 30 of the stationary support 26 by means of screws (not shown) that pass through the collar 50. It thus is possible to detach the collar 50 easily when no boxing operation is required, as will be explained in more detail below. Thus, the upper bearing face 52 is carried by a first removable element, here the stop ring 48, which is attached in a detachable manner to the stationary support 26, here by means of screws.

During a stretch-blow-molding operation, it is known to immobilize the half-molds 14 in the closed position in relation to the mold bottom 16. This makes it possible to obtain a precise molding of the impression by avoiding making beads of material appear on the final container in the area of the attachment planes.

In the molding unit 10 produced according to the teachings of the invention, the carriage 24 is to be able to slide vertically in relation to the half-molds 14 in the closed position. To make possible a precise positioning of the mold bottom 16 in relation to the half-molds 14, two devices are used.

First of all, the half-molds 14 are closed on the stationary support 26. The unit is locked by interlocking elements of complementary shapes between the half-molds 14 and the stationary support 26.

As shown in particular in FIGS. 2 and 3, each of the half-molds 14 is equipped with an associated locking bit 60. Each bit 60 has an annular sector shape that assumes the shape of the lower face 47 of the associated half-mold 14. An upper face 62 of the bit 60 is applied against the lower face 47 of the half-mold 14, and then the bit 60 is attached in a detachable manner directly on the half-mold 14, for example by means of screws.

As a variant, not shown, of the invention, since the half-mold 14 is secured in a rigid manner in its mold carrier, the bits 60 are attached under the lower face of the mold carriers. Since the half-mold 14 is stationary in relation to the associated mold carrier, each bit is attached under the associated half-mold by means of the mold carrier. In this case, the bits 60 are permanently attached to the molding unit, and it is not necessary to detach them for each mold change.

Each bit 60 has on its concave face, directed radially toward the axis "B" of the impression 15, an open groove 64 opposite the collar 50 of the stop ring 48, as is shown in FIG.

2. The groove 64 is delimited from below by a flange 66 that projects radially toward the inside.

Figure 7:
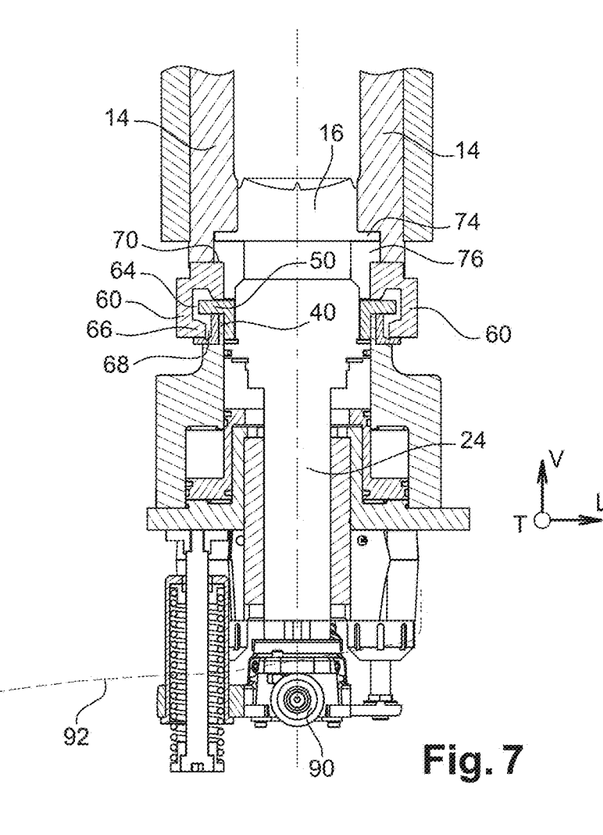
FIG. 7 is a view that is similar to the one of FIG. 2 in which the half-molds occupy their attached position, while the mold bottom occupies its upper molding position.

When the half-molds 14 are controlled in their attached molding position, as is illustrated in FIG. 7, the bits 60 clamp an upper end segment of the chimney 40. On its outer face, the chimney 40 has a groove 68 that accommodates the flange 66 of the bits 60. The collar 50 of the stop ring 48 and a flange of the chimney 40 are also accommodated in the groove 64 of the bits 60. These first locking means make it possible to immobilize the half-molds 14 vertically in the closed position in relation to the stationary support 26, knowing that the carriage 24 is itself guided precisely by sliding in the stationary support 26.

The first locking means make it possible to keep the half-molds 14 in position in relation to the stationary support 26 during the blow-molding operation and during the boxing operation during which the blow-molding fluid pressure applies extremely intense forces to the half-molds 14 and to the mold bottom 16.

To implement the boxing operation, the mold bottom 16 can be moved between the two half-molds 14 in an attached molding position on an oriented, so-called boxing path, extending from an initial intermediate boxing position that is well defined to its upper molding position. Said intermediate position forms an initial boxing position in which the mold bottom 16 is arranged above its lower extraction position.

Figure 8:
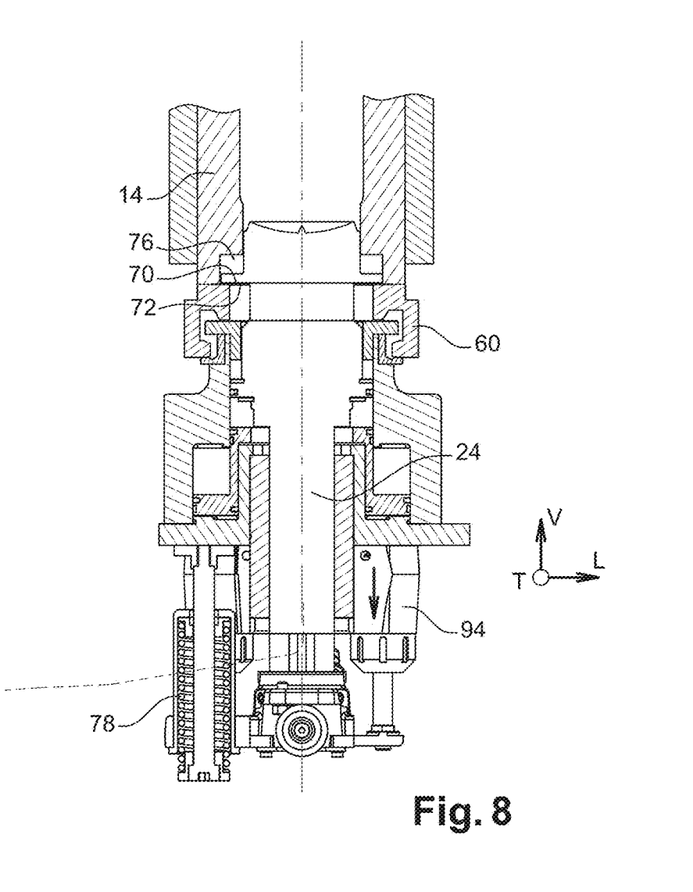
FIG. 8 is a view that is similar to the one of FIG. 2 in which the half-molds occupy their attached position, while the mold bottom occupies its initial intermediate boxing position.

The initial intermediate boxing position is to be defined precisely so that the length of the boxing path is adapted to the shape of the container to be formed. For this purpose, the carriage 24 is stopped in its initial intermediate boxing position by contact with a lower bearing face 70. At least one of the half-molds 14 comprises the lower bearing face 70 that limits the movement of the carriage 24 toward the bottom in its initial intermediate boxing position when the half-molds 14 occupy their attached molding position, as illustrated in FIG. 8.

So that the boxing path is adapted to different final container shapes, the lower bearing face 70 is carried by a second removable element that is attached in a detachable manner under the associated half-mold 14. In the embodiment shown in the figures, the lower bearing face 70 is formed here by a portion of the upper face of the bits 60.

As a variant, the lower bearing face is located below the upper face of the bits. The bits then comprise a counterbore in their upper faces. This makes it possible to make the initial intermediate boxing position of the carriage vary as a function of the shape of the final container and as a function of the length of the boxing path.

The mold bottom 16 comprises a stop face 72 that is designed to come into contact with the lower bearing face 70. This stop face 72 forms a lower face of a second collet 74 that extends radially projecting from the mold bottom 16. This collet 74 is accommodated in a counterbore 76 made in the lower face 47 of the half-molds 14, around the passage opening 46 of the mold bottom 16. This counterbore 76 makes it possible to release the portion of the upper face 62 of the bits 60 forming the lower bearing face 70.

The movements of the carriage 24 are controlled by three distinct actuating means. Each actuating means makes it possible to carry out a specific step of the boxing method.

First actuating means make it possible to move the carriage 24 in relation to its stationary support 26 between the lower position of the mold bottom 16 and its initial intermediate boxing position.

The first actuating means comprise elastic return means that exert an elastic return force of the carriage 24 toward its upper molding position. The elastic return means are formed by a mechanical or pneumatic spring 78.

A lower cup 80 that is carried by the lower end of a screw 82 with a vertical axis. The screw 82 is screwed under the cover 36 of the stationary support 26, parallel to the portion 28 for guiding the carriage 24. The lower cup 80 thus forms a stationary support point of the spring 78.

A longitudinal arm 84 extends from a lower end segment 86 of the guide carriage 24 that is located under the guide portion 28. The arm 84 bears a sleeve 88 that is mounted to slide on the screw 82. The sleeve 88 is designed to house the spring 78. An upper end face of the sleeve 88 is arranged above the cup 80.

The spring 78 is inserted vertically between the lower cup 80 and the upper end face of the sleeve 88 to exert the vertical elastic return force of the carriage 24 toward its upper molding position by resting on the cup 80.

The first actuating means also comprise an arming device that can exert an arming force on the carriage 24 to move it from its upper molding position to its initial intermediate boxing position against the elastic return force on an arming path that is oriented toward the bottom.

The arming device is formed by at least one jack 94 that is inserted between the stationary support 26 and the carriage 24. In the embodiment shown in the figures, the jack 94 is inserted vertically between a lower face of the cover 36 and a second arm 96 that extends transversely from the lower end segment 86 of the carriage 24.

The jack 94 comprises a body in which an actuating rod is mounted to slide. The body of the jack 94 is heavier than the sliding rod. To lighten the carriage 24, the body of the jack 94 is therefore attached to the cover 36, while the free end of the sliding rod of the jack 94 is attached to the carriage 24. This arrangement of the jack 94 also makes it possible to simplify the pneumatic fluid supply of the jack 94, because the body of the jack 94 is found on a stationary part rather than on the carriage.

These first actuating means thus make it possible to control the movements of the carriage 24 from its lower extraction position to its upper molding position in a first step, by means of the spring 78, and then from its upper molding position to its initial intermediate boxing position in a second step, by means of the jack 94.

The second actuating means making it possible to carry out the boxing operation comprise at least the cylinder 32 and a piston 98 that is housed in the cylinder 32. The piston 98 divides the cylinder 32 into an upper chamber 99 and a lower working chamber 100.

The lower working chamber 100 and the upper chamber 99 each comprise at least one opening (not shown) that makes it possible to inject and/or to evacuate a working fluid.

Figure 9:
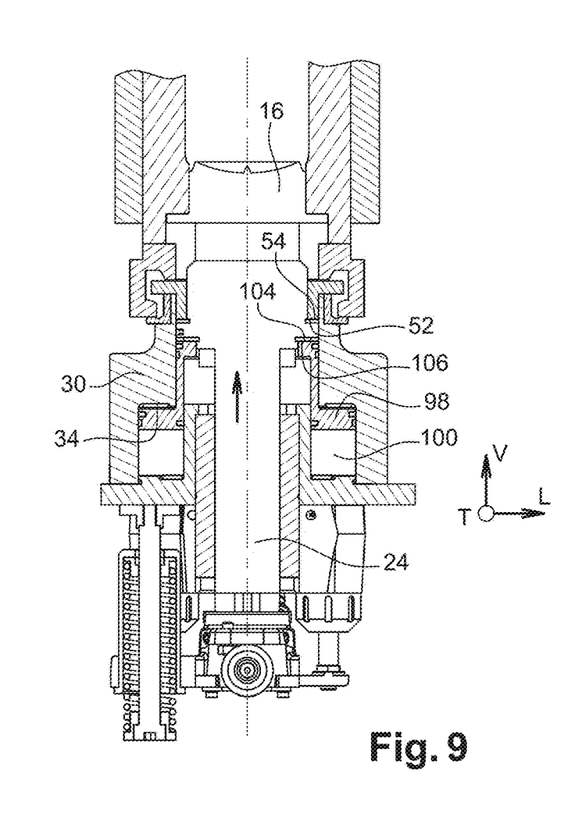
FIG. 9 is a view that is similar to the one of FIG. 2 in which the half-molds occupy their attached position, while the mold bottom occupies its upper molding position in which it is held by the piston.

The piston 98 is mounted to slide vertically into the cylinder 32 between a lower rest position in which the piston 98 rests on the lower cover 36 and in which the lower working chamber 100 has a minimum volume, as illustrated in, for example, FIG. 2, and an upper position in which the piston 98 is located close to the upper wall 34 of the bell 30 and in which the lower working chamber 100 has a maximum volume, as illustrated in FIG. 9.

A central tube 102 extends toward the top from a central part of the piston 98. An upper end face 104 of the tube 102 can put stress on a lower face 106 of the carriage 24 in the chimney 40 when the piston 98 is moved toward its upper position. The lower face 106 is formed here by a lower face of the first collet 56.

When a working fluid is injected into the lower working chamber 100 of the cylinder 32 at a pressure that is much higher than the one prevailing in the upper chamber 99, the piston 98 can exert a boxing force that pushes the mold bottom 16 on an oriented boxing path from its initial intermediate boxing position to its upper molding position. The boxing path is reversed in relation to the arming path.

The lower working chamber 100 is supplied with a high-pressure fluid, for example approximately 40 bars, while the upper chamber 99 is filled with a low-pressure fluid, for example 1 bar, in such a way that the boxing force exerted by the piston 98 is greater than the sum of the arming force that can be exerted by the jack 94, the blow-molding pressure force exerted on the mold bottom, and, if necessary, the force of the elongation rod. Thus, when the piston 98 is actuated while the jack 94 is still active, the carriage 24 is moved to its upper molding position against the arming force of the jack 94.

In this design, the cylinder 32 is stationary in relation to the stationary support 26. This makes it possible to lighten the carriage 24 considerably in relation to the carriages of the state of the art. The rate of production of the containers can thus be increased without an appreciable increase in the consumption of energy by the blow-molding machine.

In addition, the piston 98 slides freely in relation to the carriage 24. In other words, the carriage 24 can slide between its lower extraction position and its upper molding position while the piston 98 remains stationary. This makes it possible to reduce the weight of the carriage 24 even more.

The third actuating means are designed to bring the carriage 24 back into its lower extraction position after the forming operation. They comprise a cam follower 90 that is carried by the carriage 24. The cam follower 90 is formed here by a roller that is mounted to rotate around a transverse axis on the lower end segment 86 of the carriage 24.

The cam follower 90 is designed to work with a longitudinal cam track 92, shown in broken lines in FIGS. 2, 5, 7, 8 and 10. The cam track 92 is formed by the lower face of a rail that is immovable in relation to the ground on which rests the carrousel that carries the molding unit 10. Thus, when the carrousel rotates, the cam follower 90 comes into contact with the cam track 92 to make the carriage 24 slide to its lower extraction position of the finished container, against the elastic return force of the spring 78, as shown in FIG. 2.

The operation of the molding unit 10 is now described during the implementation of a method for forming containers with a boxing operation.

The method begins just after the extraction of the final container previously obtained by said molding unit 10. As shown in FIG. 2, the carriage 24 is then controlled in its lower extraction position by contact between the cam follower 90 and the cam track 92. The piston 98 and the jack 94 are at rest, thus the piston 98 occupies its lower position, and the rod of the jack 94 is retracted into the body of the jack 94. The half-molds 14 occupy their separated extraction positions, as shown in FIG. 4.

Figure 6:
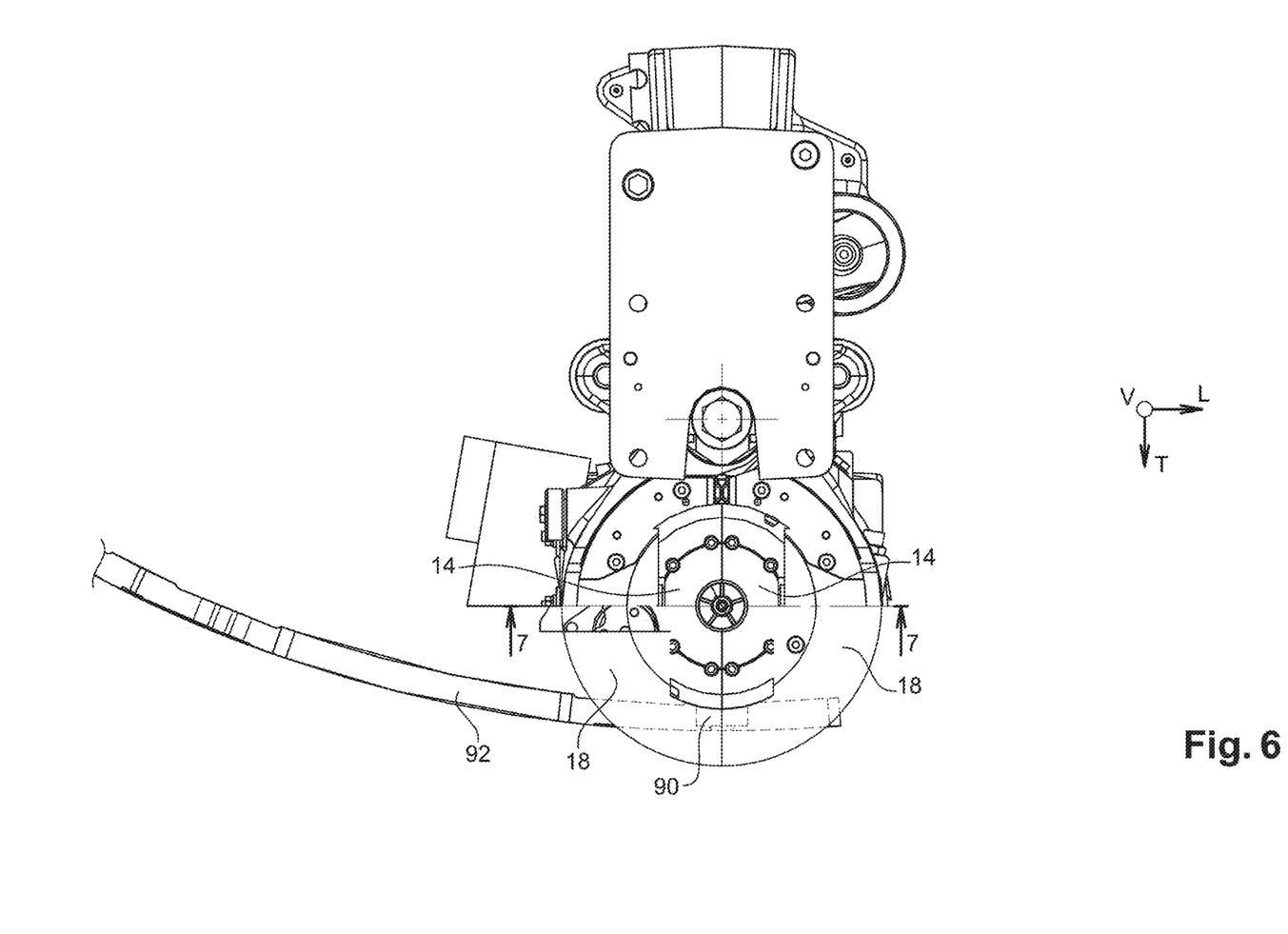
FIG. 6 is a top view that is similar to the one of FIG. 4 in which the half-molds occupy their attached position.

During a first installation step "E1," as shown in FIG. 5, the carrousel continues its rotation, driving the cam follower 90 along the cam track 92. The carriage 24 is then returned elastically by the spring 78 toward its upper molding position. The first stop face 54 of the carriage 24 enters into contact with the upper bearing face 52 of the stop ring 48 for stopping the carriage 24 in its upper molding position. During this movement of the carriage 24 toward the top, the half-molds 14 remain in a separated extraction position, as shown in FIG. 4, to make possible the passage of the second stop face 72 above the upper bearing face 70 of the bits 60, regardless of the initial intermediate boxing position of the carriage 24 later. As shown in FIG. 6, after a preform has been installed between the half-molds 14, the half-molds 14 can then be closed in their attached molding position while the carriage 24 still occupies its upper molding position, as illustrated in FIG. 7. This makes it possible to ensure that the collet 74 of the mold bottom 16 is enclosed vertically between the two half-molds 14, in the counterbore 76. The carrousel continues its rotation, and the cam follower 90 is lifted away from the cam track 92.

As a variant, not shown, of the invention, the jack 94 begins to be actuated before the half-molds 14 have reached their attached molding position. The carriage 24 thus begins its movement toward its intermediate position before the half-molds 14 are in the attached molding position. This advantageously makes it possible to reduce the time for implementing the method.

The blow-molding operation of the preform is then begun.

A second arming step "E2" is then initiated before or during the blow-molding operation. In any case, the second arming step "E2" is carried out before the deformed preform reaches the mold bottom 16 in the upper molding position.

As shown in FIG. 8, during this second arming step "E2," the carriage 24 is moved along its arming path toward the bottom by actuating the jack 94 against the elastic return force of the spring 78. The carriage 24 is then immobilized in its initial intermediate boxing position by contact of the second stop face 72 against the lower bearing face 70 of the bits 60. The mold bottom 16 is then vertically set back toward the bottom in relation to the impressions 15 of the half-molds 14.

When the preform is sufficiently deformed by blow molding to conform to the impressions 15 of the half-molds 14, a third boxing step "E3" is initiated. As shown in FIG. 9, during this third boxing step "E3," the carriage 24 is pushed very quickly along its boxing path by the piston 98 in such a way as to stretch the material of the preform during forming to form the base of the container.

To do this, the lower working chamber 100 is pressurized in such a way that the piston 98 pushes the mold bottom 16 toward the top against the pressure of the blow-molding fluid filling the preform and against the jack 94. The carriage 24 is stopped in its upper molding position by contact of its first stop face 54 with the upper bearing face 52 of the stop ring 48.

The lower working chamber 100 is kept under pressure while the pressure of the blow-molding fluid is kept in the container.

Finally, during a fourth and last step "E4" for extraction of the finished container, the carriage 24 is moved from its upper molding position to its lower extraction position, as shown in FIG. 2, after opening two half-molds 14 in their separated position, as shown in FIG. 4. The movement of the carriage 24 is controlled by contact of the cam follower 90 with the cam track 92.

During this fourth extraction step "E4," the third actuating means, in this case the follower 90, should exert a sufficient actuating force to make the carriage 24 slide to its lower extraction position against the elastic return force of the spring 78.

In addition, during this step "E4," the sliding of the piston 98 is also called from its upper boxing position to its lower rest position. This is in part carried out by making the working fluid pressure vary in the chambers 100, 99 of the cylinder.

Figure 10:
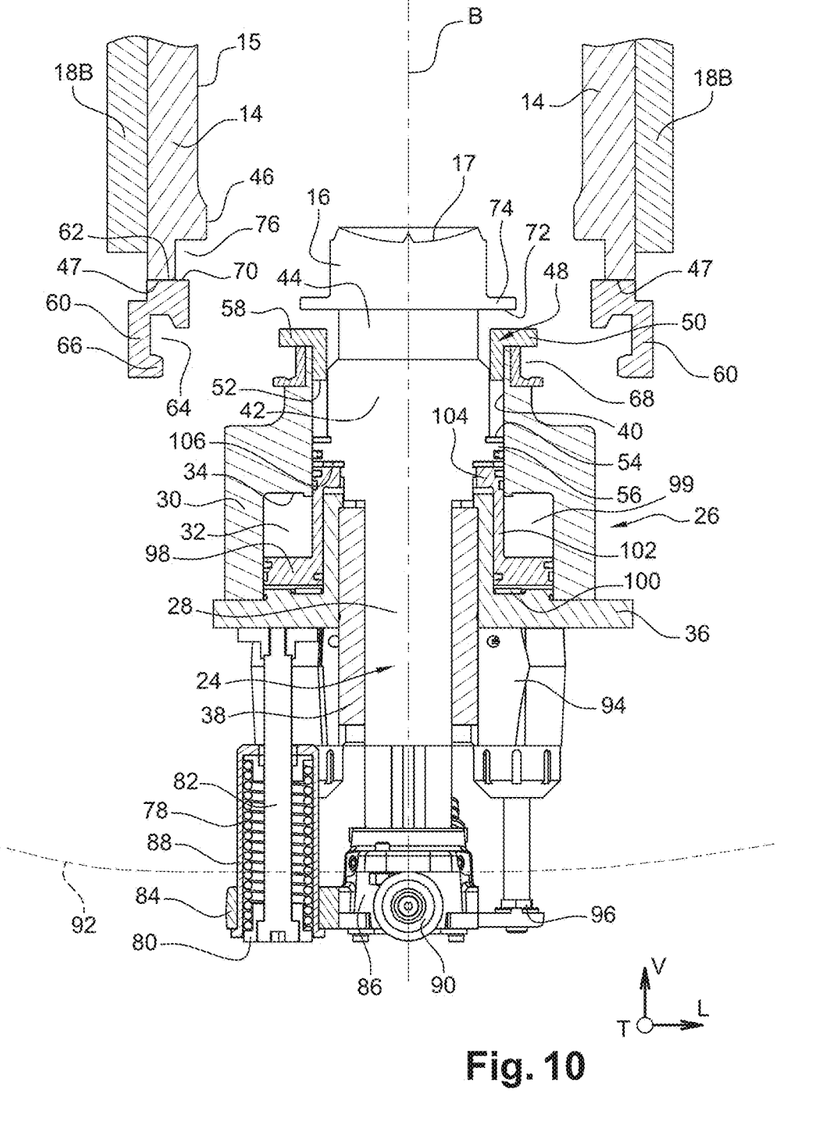
FIG. 10 is a view that is similar to the one of FIG. 2 in which the half-molds occupy their separated position, while the mold bottom occupies its lower extraction position, with the piston having been pushed toward its lower rest position by the carriage.

According to the teachings of the invention, during the extraction step "E4," the movement of the carriage 24 by the third actuating means is initiated while the piston 98 is not yet returned into its lower rest position, with the carriage 24 pushing the piston 98 toward its lower rest position at least on a final part of its path to its lower extraction position, as shown in FIG. 10.

By implementing the extraction step "E4" according to the teachings of the invention, it was noted, against all expectations, that the maximum actuating force exerted by the follower 90 for making the carriage 24 slide was less than the "reference actuating force" obtained by implementing the embodiment of the state of the art described in the preamble.

One skilled in the art would be expected to see the actuating force increase in relation to the maximum reference actuating force since by pushing the piston 98 into its lower rest position, the carriage 24 brings about the forced evacuation of the working fluid that is present in the lower working chamber 100. However, the extraction step "E4" carried out according to the teachings of the invention makes it possible, in a surprising and unexpected manner, to obtain a maximum actuating force that is reduced in relation to the reference actuating force.

Preferably, the movement of the carriage 24 toward its lower extraction position is initiated while the piston 98 also occupies its upper boxing position. It was actually noted that the actuating force is lower when the carriage 24 pushes the piston 98 toward its lower rest position over its entire path from its upper molding position to its lower extraction position.

For this purpose, the movement of the carriage 24 by the third actuating means is initiated while the working fluid pressure in the lower working chamber 100 is greater than or equal to the pressure prevailing in the upper chamber 99. Thus, the sliding of the carriage 24 brings about the forced evacuation of the working fluid that is present in the lower working chamber.

Also preferably, the movement of the carriage 24 is initiated when the pressure between the two chambers 100, 99 is essentially balanced.

To balance the pressure between the two chambers 99, 100 more quickly, the pressure in the upper chamber 99 is increased simultaneously with a lowering of the pressure in the lower working chamber 100.

At the end of this fourth extraction step "E4," the carriage 24 occupies its lower extraction position, and the two half-molds 14 are open. The finished container is extracted, and the method can therefore be repeated for a new production cycle of a container.

The control method that is carried out according to the teachings of the invention advantageously makes it possible to reduce the maximum actuating force exerted by the roller, thus making it possible to extend the life expectancy of the roller and to reduce energy consumption in each cycle for using the molding unit.

The invention claimed is:

1. Method for controlling a molding unit (10) for the forming of a container made of thermoplastic material by blow molding of a preform, with the molding unit (10) comprising:
   a carriage (24) that carries, in a stationary manner, a mold bottom (16) and that is mounted to move in a stationary support (26) between a lower position for extraction of the finished container and an upper position for molding a base of the container;
   first actuating means for moving the carriage (24) in relation to its stationary support (26) between the lower extraction position and an initial intermediate boxing position in which the bottom (16) can be enclosed between two half-molds (14) in the attached position;
   second actuating means for moving the carriage (24) in relation to its stationary support (26) from the initial intermediate boxing position to the upper molding position, with the second actuating means comprising at least one stationary cylinder (32) in relation to the support (26) housing a piston (98) that divides the cylinder into a lower working chamber (100) and an upper chamber, with the piston (98) being able to slide between a lower rest position and an upper boxing position in which it pushes the carriage (24) to its upper molding position by pressurizing a working fluid in the lower working chamber (100) relative to the pressure prevailing in the upper chamber;
   third actuating means for moving the carriage (24) from its upper molding position to its lower extraction position;
   with the method comprising a step (E4) for extraction of a finished container taking place after the carriage (24) has been pushed to its upper molding position by the piston (98), during which the carriage (24) is moved from its upper molding position to its lower extraction position by the third actuating means;
   wherein during the extraction step (E4), the movement of the carriage (24) by the third actuating means is initiated while the piston (98) has not yet returned into its lower rest position, with the carriage (24) pushing the piston (98) toward its lower rest position at least on a final part of its path to its lower extraction position.

2. Method according to claim 1, wherein during the extraction step (E4), the movement of the carriage (24) is initiated while the piston (98) again occupies its upper boxing position.

3. Method according to claim 2, wherein the carriage (24) pushes the piston (98) toward its lower rest position over is entire path from its upper molding position to its lower extraction position.

4. Method according to claim 3, wherein during the extraction step (E4), the movement of the carriage (24) by the third actuating means is initiated while the pressure of working fluid in the lower working chamber (100) is greater than or equal to the pressure prevailing in the upper chamber (99).

5. Method according to claim 4, wherein during the extraction step (E4), the movement of the carriage (24) is initiated when the pressure is balanced between the lower working chamber (100) and the upper chamber (99).

6. Method according to claim 1, wherein the third actuating means are formed by a cam follower (90) that is carried by the carriage (24) and by a cam track (92) that works with the cam follower (90).

7. Method according to claim 1, wherein the first actuating means comprise elastic return means that exert an elastic return force of the carriage (24) toward its upper molding position.

8. Method according to claim 7, wherein the first actuating means comprise an arming device that can exert an arming force on the carriage (24) to move it from its upper position to its initial intermediate boxing position against the elastic return force on an oriented path for reverse arming in relation to the boxing path.

9. Method according to claim 1, wherein the piston (98) freely slides in relation to the carriage (24), with the carriage (24) being able to slide between its lower position and its upper position while the piston (98) remains stationary.

* * * * *